US012720458B2

(12) United States Patent
Kuravangi-Thammaiah et al.

(10) Patent No.: US 12,720,458 B2
(45) Date of Patent: Aug. 25, 2026

(54) SYSTEMS AND METHODS FOR SUPPORTING A NETWORK DATA ANALYTICS FUNCTION BASED ON INPUTS FROM AN ANCHOR USER PLANE FUNCTION

(71) Applicant: Verizon Patent and Licensing Inc., Basking Ridge, NJ (US)

(72) Inventors: Shanthala Kuravangi-Thammaiah, Keller, TX (US); Rishi Tandon, Gurugram (IN); Munshi Ebne Chayen, Apex, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 18/351,731

(22) Filed: Jul. 13, 2023

(65) Prior Publication Data

US 2025/0024401 A1 Jan. 16, 2025

(51) Int. Cl.
*H04W 60/00* (2009.01)
*H04W 24/10* (2009.01)

(52) U.S. Cl.
CPC ......... *H04W 60/005* (2013.01); *H04W 24/10* (2013.01)

(58) Field of Classification Search
CPC .... H04W 60/005; H04W 24/10; H04W 60/00
See application file for complete search history.

(56) References Cited

U.S. PATENT DOCUMENTS

2022/0150685 A1* 5/2022 Chong .................... H04W 8/18
2022/0303751 A1* 9/2022 Wang .................... H04W 76/11
2023/0147409 A1* 5/2023 Park ........................ H04L 12/56 370/329
2023/0247411 A1* 8/2023 Shariat ................ H04L 41/5054 370/329
2025/0024261 A1* 1/2025 Wu ..................... H04L 63/0485

OTHER PUBLICATIONS

"3rd Generation Partnership Project; Technical Specification Group Services and System Aspects; Architecture enhancements for 5G System (5GS) to support network data analytics services (Release 18)," 3GPP TS 23.288, Jun. 2023, 315 Pages.
"3rd Generation Partnership Project; Technical Specification Group Core Network and Terminals; 5G System; Unified Data Management Services; Stage 3 (Release 18)," 3GPP TS 29.503, Jun. 2023, 628 Pages.
"3rd Generation Partnership Project; Technical Specification Group Services and System Aspects; Procedures for the 5G System (5GS); Stage 2 (Release 18)," 3GPP TS 23.502, Jun. 2023, 895 Pages.

* cited by examiner

*Primary Examiner* — Jung H Park

(57) ABSTRACT

A network device may provide a network function discovery request to a network repository function (NRF), and may receive, from the NRF, a network function discovery response that identifies a unified data management (UDM) component based on the network function discovery request. The network device may provide, to the UDM component, a request for a network function registration associated with a user equipment (UE), and may receive, from the UDM component, the network function registration associated with the UE based on the request for the network function registration. The network device may subscribe to user plane function (UPF) events associated with the UE from a UPF, and may receive, from the UPF, an indication of a subscription to the UPF events associated with the UE.

20 Claims, 6 Drawing Sheets

SYSTEMS AND METHODS FOR SUPPORTING A NETWORK DATA ANALYTICS FUNCTION BASED ON INPUTS FROM AN ANCHOR USER PLANE FUNCTION

BACKGROUND

Per the Third Generation Partnership Project (3GPP), a network data analytics function (NWDAF) may directly or indirectly receive analytic inputs from a user plane function (UPF).

DETAILED DESCRIPTION OF EXAMPLE EMBODIMENTS

Figure 1A:
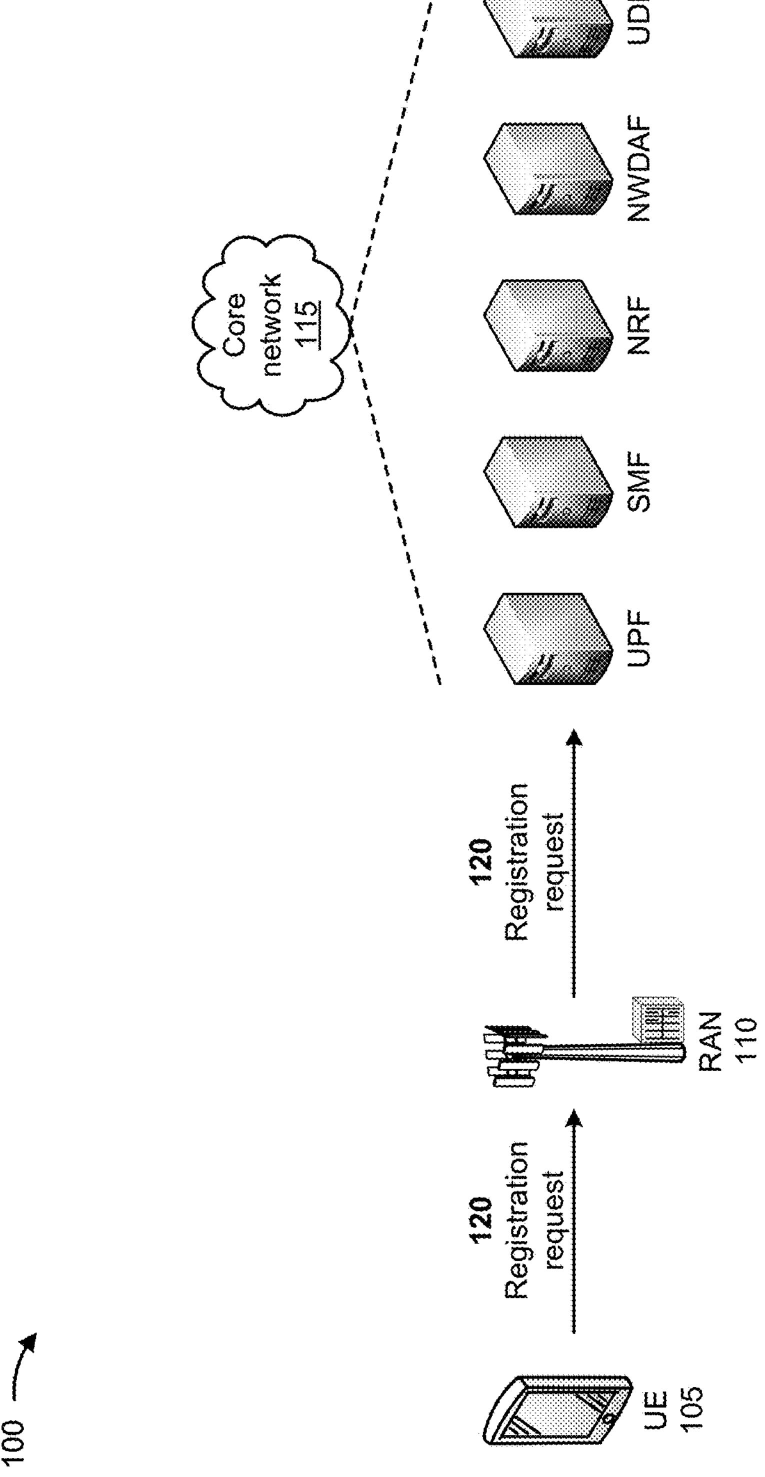
FIGS. 1A-1C are diagrams of an example associated with supporting an NWDAF based on inputs from an anchor UPF.

The following detailed description of example implementations refers to the accompanying drawings. The same reference numbers in different drawings may identify the same or similar elements.

An NWDAF may directly or indirectly receive analytic inputs from a UPF based on subscribing to UPF data and/or events via a session management function (SMF) for any user equipment (UE) use cases. The NWDAF may also subscribe to UPF data and/or events for special use cases, such as UPF load analytics, analytics related to any UE (possibly for specific network slices), a traffic usage report, and/or the like. However, 3GPP fails to define a mechanism for the NWDAF to receive analytics associated with a specific UE and a specific UPF (e.g., an anchor UPF of the specific UE). The standard provides an option to retrieve the data from an access and mobility management function (AMF), an SMF, and a policy control function (PCF) associated with a specific UE in the control plane. There are no similar options in the standard to associate a user plane network function (NF), such as the UPF, with a specific UE to provide closed loop analytics between the control plane and the user plane. Thus, current network configurations consume computing resources (e.g., processing resources, memory resources, communication resources, and/or the like), networking resources, and/or other resources associated with failing to provide analytics associated with a specific UE and a specific UPF to the NWDAF, failing to utilize the analytics associated with the specific UE and the specific UPF, failing to perform actions based on the analytics associated with the specific UE and the specific UPF, and/or the like.

Some implementations described herein provide a network device that supports an NWDAF based on inputs from an anchor UPF. For example, a network device (e.g., an NWDAF) may provide a network function discovery request to a network repository function (NRF), and may receive, from the NRF, a network function discovery response that identifies a unified data management (UDM) component based on the network function discovery request. The network device may provide, to the UDM component, a request for a network function registration associated with a UE, and may receive, from the UDM component, the network function registration associated with the UE based on the request for the network function registration. The network device may subscribe to UPF events associated with the UE from a UPF, and may receive, from the UPF, an indication of a subscription to the UPF events associated with the UE. The network device may receive, from the UPF and based on the subscription, a notification of a UPF event associated with the UE, and perform one or more actions based on the UPF event.

In this way, the network device supports an NWDAF based on inputs from an anchor UPF (e.g., a protocol data unit (PDU) session anchor point for providing mobility within and between radio access technologies). For example, a unified data management (UDM) component may be modified to support additional registration data, in a UE context management service, to accommodate UPF registration data. The UPF (e.g., an anchor UPF) may be modified to register with the UDM component based on a successful PDU session establishment by the UE, and the NWDAF may be modified to retrieve, from the UDM component, the UPF registration data associated with the UE. The SMF may be modified to provide UPF information, as part of SMF registration data, to the UDM component during the PDU session establishment by the UE and to dynamically update any changes in UPF selection. When the NWDAF retrieves the SMF registration data for the UE from the UDM component, the NWDAF may receive the UPF information associated with the PDU session and the UE. Thus, the network device may conserve computing resources, networking resources, and/or other resources that would have otherwise been consumed by failing to provide analytics associated with a specific UE and a specific UPF to the NWDAF, failing to utilize the analytics associated with the specific UE and the specific UPF, failing to perform actions based on the analytics associated with the specific UE and the specific UPF, and/or the like.

Figure 1B:
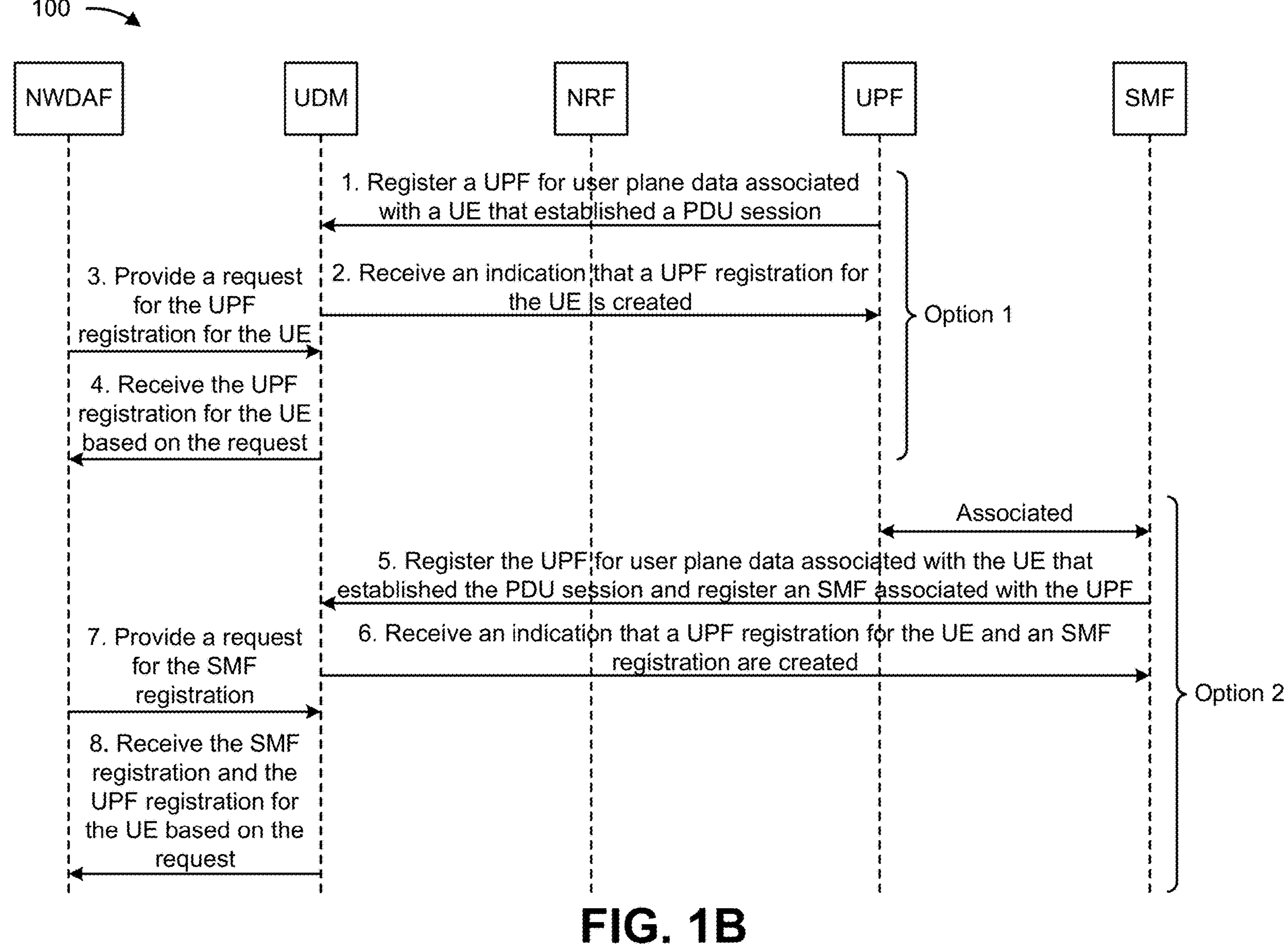
Figure 1C:
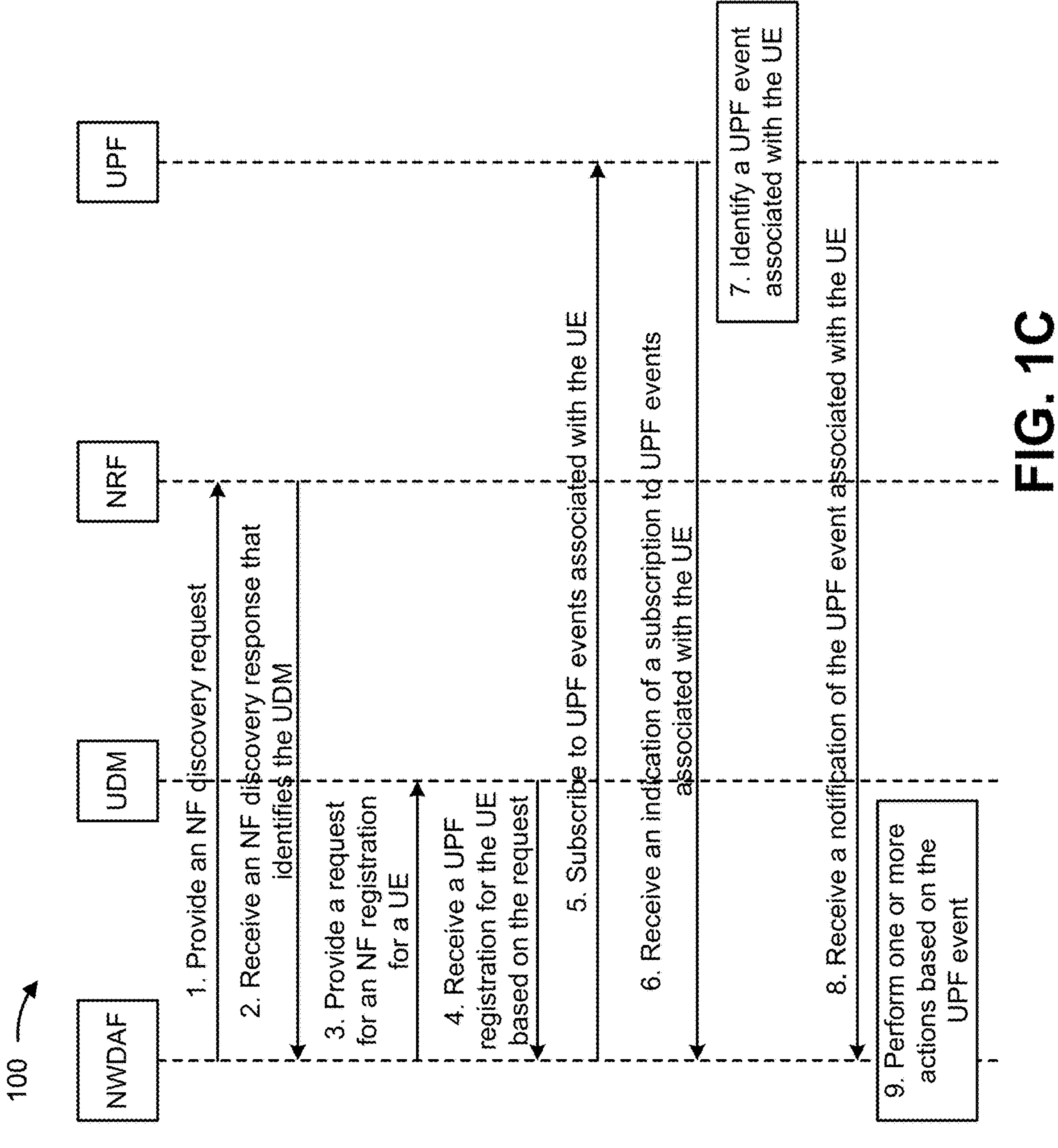

FIGS. 1A-1C are diagrams of an example 100 associated with supporting an NWDAF based on inputs from an anchor UPF. As shown in FIGS. 1A-1C, example 100 includes a UE 105, a RAN 110, and a core network 115 that includes a UPF, an SMF, a network repository function (NRF), an NWDAF, and a UDM component. Further details of the UE 105, the RAN 110, the core network 115, the UPF, the SMF, the NRF, the NWDAF, and the UDM component are provided elsewhere herein.

As shown in FIG. 1A, and by reference number 120, the UE 105 may provide a registration request (e.g., a PDU session establishment request) to the RAN 110, and the RAN 110 may provide the registration request to the core network 115. For example, the UE 105 may attempt to establish a PDU session with the core network 115, via the RAN 110, in order to communicate with other UEs 105, an application server, a cloud computing environment, and/or the like. In order to establish the PDU session, the UE 105 may generate the registration request that requests establishment of the PDU session with the RAN 110 and the core network 115. The registration request may also include credentials of a user of the UE 105, an identifier of the UE 105, and/or the like. The UE 105 may provide the registration request to the RAN 110, and the RAN 110 may forward the registration request to the core network 115. The core network 115 may receive the registration request from the RAN 110.

FIGS. 1B and 1C are call flow diagrams depicting steps associated with supporting an NWDAF based on inputs from an anchor UPF (e.g., the UPF shown in FIG. 1A). In some implementations, steps 1-4 of FIG. 1B may be associated with an option (e.g., option 1) for the NWDAF to discover a UPF associated with a particular UE (e.g., the UE 105). As shown at step 1 of FIG. 1B, the anchor UPF may register, with the UDM component, for user plane data associated with the UE 105 that established the PDU session. For example, the UDM component may be modified to support additional registration data, set in a UE context management service, to accommodate UPF registration data associated with the UPF. The UPF may be modified to register with the UDM component (e.g., per a subscription permanent identifier (SUPI) allocated to the UE 105 and/or per a data network name (DNN)) upon successful PDU session establishment by the UE 105. As shown at step 2, the UPF may receive, from the UDM component, an indication that a UPF registration for the UE 105 is created in the UDM component.

As shown at step 3 of FIG. 1B, the NWDAF may provide, to the UDM component, a request for the UPF registration data for the UE 105. For example, the NWDAF interface towards the UDM component may be enhanced to retrieve the UPF registration data associated with the UE 105. As shown at step 4, the NWDAF may receive, from the UDM component, the UPF registration data associated with the UE 105 based on the request for the UPF registration data. For example, the UDM component may provide, based on the request and to the NWDAF, the UPF registration data associated with the UE 105.

In some implementations, steps 5-8 of FIG. 1B may be associated with another option (e.g., option 2) for the NWDAF to discover a UPF associated with a particular UE (e.g., the UE 105). As shown in FIG. 1B, the UPF may be associated with the SMF. As shown at step 5, the SMF may register, with the UDM component, the UPF for user plane data associated with the UE 105 that established the PDU session and register the SMF associated with the UPF. For example, the SMF may be modified to provide associated UPF registration data as part of SMF registration data to the UDM component during the PDU session establishment and to dynamically update any changes in UPF selection. As shown at step 6, the SMF may receive, from the UDM component, an indication that a UPF registration for the UE 105 and an SMF registration are created in the UDM component.

As shown at step 7 of FIG. 1B, the NWDAF may provide, to the UDM component, a request for the SMF registration data. As shown at step 8, the NWDAF may receive, from the UDM component, the SMF registration data and the UPF registration data associated with the UE 105 based on the request for the SMF registration data. For example, the UDM component may provide, based on the request and to the NWDAF, the SMF registration data and the UPF registration data associated with the UE 105. When the NWDAF receives the SMF registration data from the UDM component for the UE 105, the NWDAF may also receive the UPF registration data associated with the PDU session and the UE 105.

As shown at step 1 of FIG. 1C, the NWDAF may provide an NF discovery request to the NRF. For example, the NF discovery request may request identification of a UDM component that includes UPF registration data associated with a specific UE (e.g., the UE 105). As shown at step 2, the NWDAF may receive, from the NRF, an NF discovery response that identifies the UDM component. For example, since the UDM component includes the UPF registration data associated with the UE 105, the NRF may identify the UDM component based on the NF discovery request. The NRF may generate the NF discovery response that identifies the UDM component, and may provide the NF discovery response to the NWDAF based on the NF discovery request.

As shown at step 3 of FIG. 1C, the NWDAF may provide, to the UDM component, a request for NF registration data for the UE 105. For example, the NWDAF may be modified to retrieve, from the UDM component, the UPF registration data associated with the UE 105. Alternatively, or additionally, the NWDAF may provide, to the UDM component, a request for SMF registration data. As shown at step 4, the NWDAF may receive, from the UDM component, the UPF registration data associated with the UE 105 based on the request for the NF registration data. For example, the UDM component may provide, based on the request and to the NWDAF, the UPF registration data associated with the UE 105. Alternatively, or additionally, the NWDAF may receive, from the UDM component, the SMF registration data and the UPF registration data associated with the UE 105 based on the request for the NF registration data. For example, the UDM component may provide, based on the request and to the NWDAF, the SMF registration data and the UPF registration data associated with the UE 105.

As shown at step 5 of FIG. 1C, the NWDAF may subscribe to UPF events associated with the UE 105. For example, the NWDAF and the UPF may be modified to enable the NWDAF to directly subscribe to UPF events for the UE 105 from the UPF. The NWDAF may utilize the UPF registration data to identify the UPF, and may subscribe to UPF events for the UE 105 from the identified UPF. As shown at step 6, the NWDAF may receive, from the UPF, an indication of a subscription to UPF events associated with the UE 105. For example, the NWDAF may receive the indication of the subscription to the UPF events based on subscribing to the UPF events associated with the UE 105.

As shown at step 7 of FIG. 1C, the UPF may identify a UPF event associated with the UE 105. For example, the UPF event may include an event associated with communication and user plane traffic for the UE 105 over a period of time, an event that identifies a location or a network slice where the UE 105 utilizes a largest quantity of data over period of time, an event that identifies quality of service (QoS) changes for the UE 105, an event that identifies data congestion associated with the UE 105 over a period of time, an event that identifies a service experience for the UE 105, an event that identifies a redundant transmission experience for the UE 105, and/or the like. As shown at step 8, the NWDAF may receive, from the UPF, a notification of the UPF event associated with the UE 105. For example, the UPF may be modified to send UE specific event notifications directly to the NWDAF.

As shown at step 9 of FIG. 1C, the NWDAF may perform one or more actions based on the UPF event. For example, when performing the one or more actions based on the UPF event, the NWDAF may calculate analytics associated with communication and user plane traffic for the UE 105 over a period of time, may calculate analytics that identify a location or a network slice where the UE 105 utilizes a largest quantity of data over a period of time, may calculate analytics that identify quality of service changes for the UE 105, may calculate analytics that identify data congestion associated with the UE 105 over a period of time, may calculate analytics that identify a service experience for the UE 105, may calculate analytics that identify a redundant transmission experience for the UE 105, and/or the like.

In some implementations, the NWDAF may calculate UE related communications analytics based on the UPF event. The UE related communications analytics may include analytics associated with UE communication and user plane traffic patterns for the UE 105 over a period of time. The UE related communications analytics may be calculated based on information provided by the NWDAF (e.g., a UE identifier (ID), a UE group ID, and/or the like) and information provided by the UPF (e.g., an uplink data rate, a downlink data rate, a traffic volume, and/or the like).

In some implementations, the NWDAF may calculate UE related dispersion analytics based on the UPF event. The UE related dispersion analytics may identify a location or a network slice where the UE 105 disperses the most data volume and sessions transactions over a period of time. The UE related dispersion analytics may be calculated based on information provided by the NWDAF (e.g., a UE ID, a UE group ID, and/or the like) and information provided by the UPF (e.g., an application ID, a location of an application, uplink and downlink data volume, an application duration, and/or the like).

In some implementations, the NWDAF may calculate service experience QoS sustainability analytics based on the UPF event. The service experience QoS sustainability analytics may include QoS change statistics for the UE 105 over a period of time.

In some implementations, the NWDAF may calculate performance user data congestion analytics based on the UPF event. The performance user data congestion analytics may include data congestion related analytics of another NF over a period of time, may be associated with a specific area, a specific UE, and/or the like, and may include control plane traffic, user plane traffic, or both. The performance user data congestion analytics may be calculated based on information provided by the NWDAF (e.g., a UE ID, a UE group ID, and/or the like) and information provided by the UPF (e.g., an application ID, a packet filter set, a measurement period, uplink and downlink throughput, a timestamp, an achieved sampling ratio, and/or the like).

In some implementations, the NWDAF may calculate wide local area network (WLAN) performance analytics based on the UPF event. The WLAN performance analytics may include a quality and a performance of a WLAN connection of the UE 105 based on a location of the UE 105 over a period of time. The WLAN performance analytics may be calculated based on information provided by the NWDAF (e.g., a UE ID, a UE group ID, and/or the like) and information provided by the UPF (e.g., an uplink data rate, a downlink data rate, a traffic volume, and/or the like).

In some implementations, the NWDAF may calculate observed service experience analytics based on the UPF event. The observed service experience analytics may be provided for a network slice, an application, and/or an edge application over an uplink path and/or application over the RAN 110 or a frequency type. The observed service experience analytics may be calculated based on information provided by the NWDAF (e.g., a UE ID, a UE group ID, and/or the like) and information provided by the UPF (e.g., a QoS flow bit rate, a QoS flow packet delay, a packet transmission, a packet retransmission, and/or the like).

In some implementations, the NWDAF may calculate redundant transmission experience analytics based on the UPF event. The redundant transmission experience analytics may include information for the SMF to determine a necessity of redundant transmission on interfaces for the UE 105, on a per cell, per network slice, and/or the like basis, over a period of time. The redundant transmission experience analytics may be calculated based on information provided by the NWDAF (e.g., a UE ID, a UE group ID, and/or the like) and information provided by the UPF (e.g., an uplink packet delay, a downlink packet delay, and/or the like).

In this way, the network device supports an NWDAF based on inputs from an anchor UPF. For example, the UDM component may be modified to support additional registration data, in a UE context management service, to accommodate UPF registration data. The UPF may be modified to register with the UDM component based on a successful PDU session establishment by the UE, and the NWDAF may be modified to retrieve, from the UDM component, the UPF registration data associated with the UE. The SMF may be modified to provide UPF information, as part of SMF registration data, to the UDM component during the PDU session establishment by the UE and to dynamically update any changes in UPF selection. When the NWDAF retrieves the SMF registration data for the UE from the UDM component, NWDAF may receive the UPF information associated with the PDU session and the UE. Thus, the network device may conserve computing resources, networking resources, and/or other resources that would have otherwise been consumed by failing to provide analytics associated with a specific UE and a specific UPF to the NWDAF, failing to utilize the analytics associated with the specific UE and the specific UPF, failing to perform actions based on the analytics associated with the specific UE and the specific UPF, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
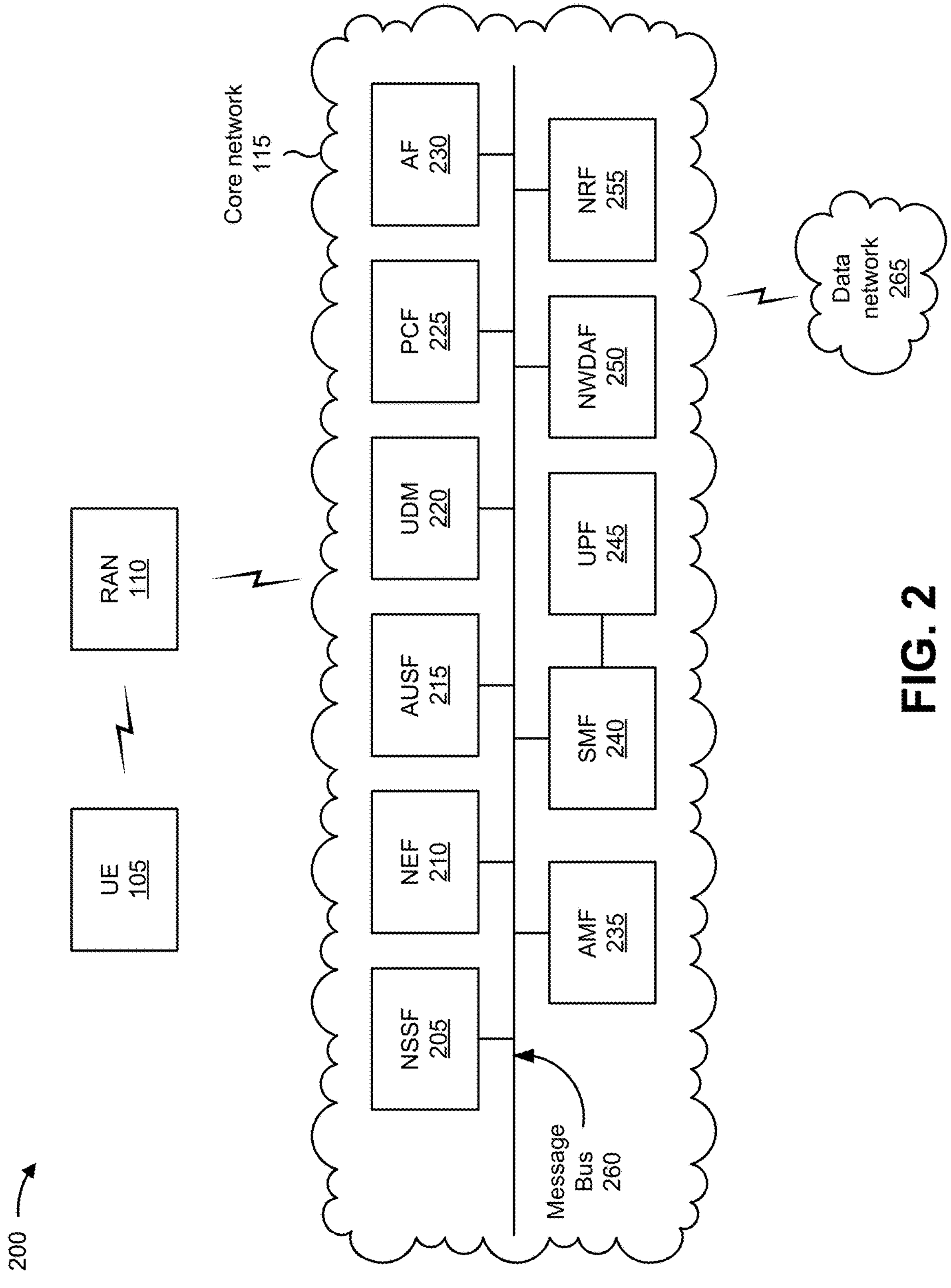
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the UE 105, the RAN 110, the core network 115, and a data network 265. Devices and/or networks of the example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a UDM component 220, a PCF 225, an application function (AF) 230, an AMF 235, an SMF 240, a UPF 245, an NWDAF 250, and/or an NRF 255. These functional elements may be communicatively connected via a message bus 260. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM component 220 includes one or more devices that store user data and profiles in the wireless telecommunications system. The UDM component 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane QoS, among other examples.

The NWDAF 250 includes one or more devices that collect data from UEs, network functions, operations, administration, and maintenance (OAM) systems, and/or the like from the core network 115, a cloud computing environment, edge networks, and/or the like, and that utilize the data for analytics.

The NRF 255 includes one or more devices that provide an index that can be consulted by other NFs, so that the other NFs may discover information regarding other entities present in the core network 115, as well as service capabilities that may be required.

The message bus 260 represents a communication structure for communication among the functional elements. In other words, the message bus 260 may permit communication between two or more functional elements.

The data network 265 includes one or more wired and/or wireless data networks. For example, the data network 265 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
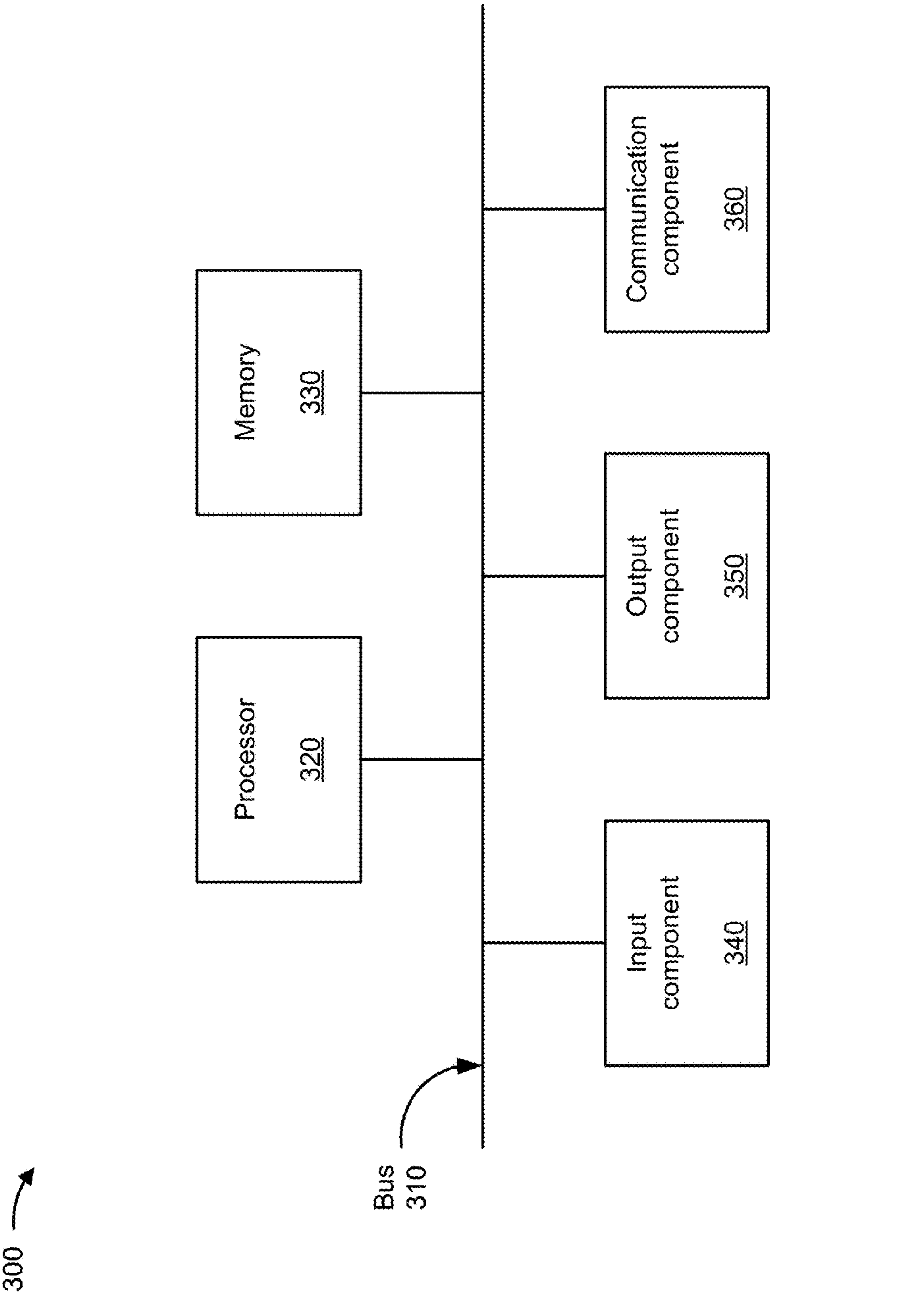
FIG. 3 is a diagram of example components of one or more devices of FIG. 2.

FIG. 3 is a diagram of example components of a device 300, which may correspond to the UE 105, the RAN 110, the NSSF 205, the NEF 210, the AUSF 215, the UDM component 220, the PCF 225, the AF 230, the AMF 235, the SMF 240, the UPF 245, the NWDAF 250, and/or the NRF 255. In some implementations, the UE 105, the RAN 110, the NSSF 205, the NEF 210, the AUSF 215, the UDM component 220, the PCF 225, the AF 230, the AMF 235, the SMF 240, the UPF 245, the NWDAF 250, and/or the NRF 255 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
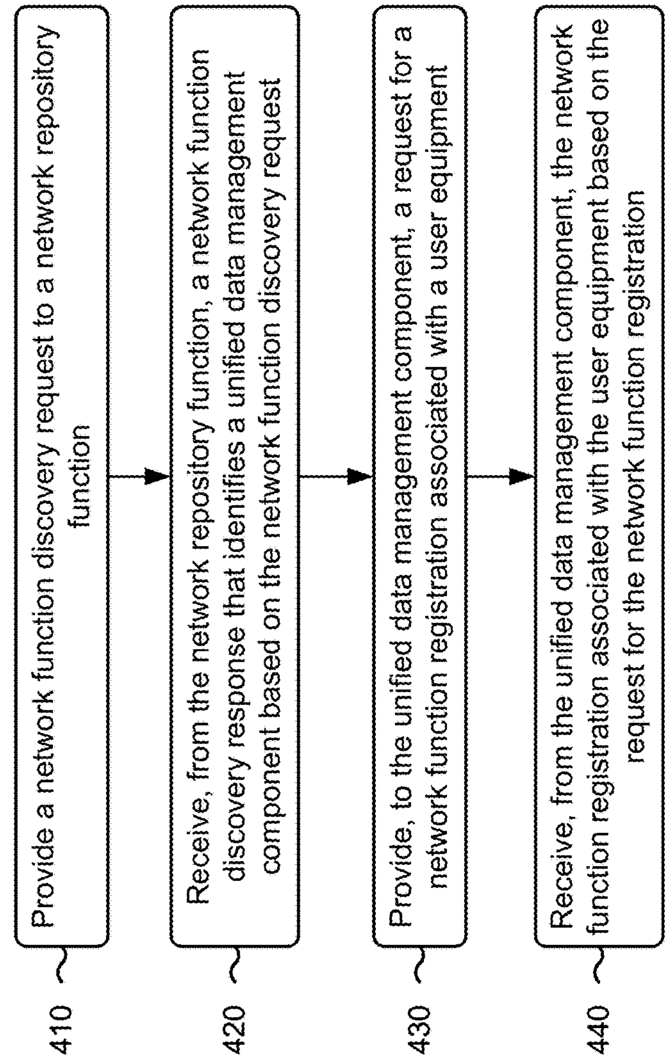
FIG. 4 is a flowchart of an example process for supporting an NWDAF based on inputs from an anchor UPF.
Figure 4:

FIG. 4 is a flowchart of an example process 400 for supporting an NWDAF based on inputs from an anchor UPF. In some implementations, one or more process blocks of FIG. 4 may be performed by a network device (e.g., the NWDAF 250). In some implementations, one or more process blocks of FIG. 4 may be performed by another device or a group of devices separate from or including the network device, such as a RAN (e.g., the RAN 110), a PCF (e.g., the PCF 225), and/or a NRF (e.g., the NRF 255). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing a network function discovery request to a network repository function (block 410). For example, the network device may provide a network function discovery request to a network repository function, as described above. In some implementations, the network device is a network data analytics function.

As further shown in FIG. 4, process 400 may include receiving, from the network repository function, a network function discovery response that identifies a unified data management component based on the network function discovery request (block 420). For example, the network device may receive, from the network repository function, a network function discovery response that identifies a unified data management component based on the network function discovery request, as described above.

As further shown in FIG. 4, process 400 may include providing, to the unified data management component, a request for a network function registration associated with a user equipment (block 430). For example, the network device may provide, to the unified data management component, a request for a network function registration associated with a user equipment, as described above. In some implementations, providing the request for the network function registration associated with the user equipment includes providing a request for a user plane function registration associated with the user equipment. In some implementations, providing the request for the network function registration associated with the user equipment includes providing a request for a session management function registration associated with the user equipment.

As further shown in FIG. 4, process 400 may include receiving, from the unified data management component, the network function registration associated with the user equipment based on the request for the network function registration (block 440). For example, the network device may receive, from the unified data management component, the network function registration associated with the user equipment based on the request for the network function registration, as described above. In some implementations, receiving the network function registration associated with the user equipment includes receiving a user plane function registration associated with the user equipment based on the request for the network function registration. In some implementations, receiving the network function registration associated with the user equipment includes receiving a session management function registration and a user plane function registration, associated with the user equipment, based on the request for the network function registration. In some implementations, a session management function, associated with the session management function registration, is associated with a user plane function associated with the user plane function registration.

In some implementations, the unified data management component receives the network function registration from a user plane function. In some implementations, the unified data management component receives the network function registration from a session management function.

In some implementations, process 400 includes subscribing to user plane function events associated with the user equipment from the user plane function, and receiving, from the user plane function, an indication of a subscription to the user plane function events associated with the user equipment. In some implementations, process 400 includes receiving, from the user plane function and based on the subscription, a notification of a user plane function event associated with the user equipment, and performing one or more actions based on the user plane function event.

In some implementations, performing the one or more actions includes one or more of calculating analytics associated with communication and user plane traffic for the user equipment over a period of time, calculating analytics that identify a location or a network slice where the user equipment utilizes a largest quantity of data over period of time, or calculating analytics that identify quality of service changes for the user equipment. In some implementations, performing the one or more actions includes one or more of calculating analytics that identify data congestion associated with the user equipment over a period of time, calculating analytics that identify a service experience for the user equipment, or calculating analytics that identify a redundant transmission experience for the user equipment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

providing, by a network data analytics function (NWDAF), a network function discovery request to a network repository function, the network function discovery request comprising an identification of a unified data management component and a user plane function associated with a user equipment (UE);

receiving, by the NWDAF and from the network repository function, a network function discovery response that identifies the unified data management component based on the network function discovery request;

providing, by the NWDAF and to the unified data management component, a request for a user plane function registration associated with the UE;

receiving, by the NWDAF and from the unified data management component, the user plane function registration associated with the UE based on the request for the user plane function registration; and subscribing, by the NWDAF, to user plane function events associated with the user plane function and the UE based on the user plane function registration, wherein the user plane function events are associated with a closed loop exclusive to the user plane function and the UE.

2. The method of claim 1, wherein providing the request for the user plane function registration associated with the UE comprises:

providing a request for a session management function registration associated with the UE.

3. The method of claim 1, wherein receiving the user plane function registration associated with the UE comprises:

receiving a session management function registration, associated with the UE, based on the request for the user plane function registration.

4. The method of claim 3, wherein a session management function, associated with the session management function registration, is associated with the user plane function.

5. The method of claim 1, further comprising:

receiving, from the user plane function, an indication of a subscription to the user plane function events associated with the UE.

6. The method of claim 5, further comprising:

receiving, from the user plane function and based on the subscription, a notification of a user plane function event associated with the UE; and performing one or more actions based on the user plane function event.

7. The method of claim 6, wherein performing the one or more actions further comprises:

calculating analytics associated with communication and user plane traffic for the UE over a period of time;

calculating analytics that identify a location or a network slice where the UE utilizes a largest quantity of data over period of time; or calculating analytics that identify quality of service changes for the UE.

8. The method of claim 6, wherein performing the one or more actions further comprises:

calculating analytics that identify data congestion associated with the UE over a period of time;

calculating analytics that identify a service experience for the UE; or calculating analytics that identify a redundant transmission experience for the UE.

9. A network device, comprising:

one or more processors configured to:

provide, by the network device, wherein the network device is a network data analytics function (NWDAF), a network function discovery request to a network repository function, the network function discovery request comprising an identification of a unified data management component and a user plane function associated with a user equipment (UE);

receive, by the NWDAF and from the network repository function, a network function discovery response that identifies the unified data management component based on the network function discovery request;

provide, by the NWDAF and to the unified data management component, a request for a user plane function registration associated with the UE;

receive, by the NWDAF and from the unified data management component, the user plane function registration associated with the UE based on the request for the user plane function registration; and subscribe, by the NWDAF, to one or more user plane function events associated with the user plane function and the UE based on the user plane function registration, wherein the one or more user plane function events are associated with a closed loop exclusive to the user plane function and the UE.

10. The network device of claim 9, wherein the one or more processors are further configured to:

receive, from the user plane function, an indication of a subscription to the user plane function events associated with the UE.

11. The network device of claim 10, wherein the one or more processors are further configured to:

receive, from the user plane function and based on the subscription, a notification of a user plane function event associated with the UE; and perform one or more actions based on the user plane function event.

12. The network device of claim 11, wherein the one or more processors, to perform the one or more actions, are configured to one or more of:

calculate analytics associated with communication and user plane traffic for the UE over a period of time;

calculate analytics that identify a location or a network slice where the UE utilizes a largest quantity of data over period of time; or calculate analytics that identify quality of service changes for the UE.

13. The network device of claim 11, wherein the one or more processors, to perform the one or more actions, are configured to one or more of:

calculate analytics that identify data congestion associated with the UE over a period of time;

calculate analytics that identify a service experience for the UE; or calculate analytics that identify a redundant transmission experience for the UE.

14. The network device of claim 9, wherein the unified data management component receives the user plane function registration from the user plane function.

15. The network device of claim 9, wherein the unified data management component receives the user plane function registration from a session management function.

16. A non-transitory computer-readable medium storing a set of instructions, the set of instructions comprising:

one or more instructions that, when executed by one or more processors of a network data analytics function (NWDAF), cause the network NWDAF to:

provide by the NWDAF a network function discovery request to a network repository function, the network function discovery request comprising an identification of a unified data management component and a user plane function associated with a user equipment (UE);

receive, by the NWDAF and from the network repository function, a network function discovery response that identifies the unified data management component based on the network function discovery request;

provide, by the NWDAF and to the unified data management component, a request for a user plane function registration associated with the UE;

receive, by the NWDAF and from the unified data management component, the user plane function registration associated with the UE based on the request for the user plane function registration;

subscribe, by the NWDAF, to user plane function events associated with the user plane function and the UE based on the user plane function registration, wherein the user plane function events are associated with a closed loop exclusive to the user plane function and the UE;

receive, by the NWDAF and from the user plane function, an indication of a subscription to the user plane function events associated with the UE;

receive, by the NWDAF and from the user plane function and based on the subscription, a notification of a user plane function event associated with the UE; and perform one or more actions based on the user plane function event.

17. The non-transitory computer-readable medium of claim 16, wherein the one or more instructions, that cause the NWDAF to provide the request for the user plane function registration associated with the UE, cause the NWDAF to:

provide a request for a session management function registration associated with the UE.

18. The non-transitory computer-readable medium of claim 16, wherein the one or more instructions, that cause the NWDAF to receive the user plane function registration associated with the UE, cause the NWDAF to:

receive a session management function registration, associated with the UE, based on the request for the user plane function registration.

19. The non-transitory computer-readable medium of claim 18, wherein a session management function, associated with the session management function registration, is associated with the user plane function.

20. The non-transitory computer-readable medium of claim 16, wherein the one or more instructions cause the NWDAF to one or more of:

calculate analytics associated with communication and user plane traffic for the UE over a period of time;

calculate analytics that identify a location or a network slice where the UE utilizes a largest quantity of data over period of time; or calculate analytics that identify quality of service changes for the UE.

* * * * *